United States Patent
Keramati et al.

(10) Patent No.: US 7,470,874 B2
(45) Date of Patent: Dec. 30, 2008

(54) SYSTEM FOR RADIATION-BASED REDUCTION OF PARTICULATE MATTER

(75) Inventors: Bahram Keramati, Schenectady, NY (US); Mark Woodmansee, Schenectady, NY (US); Aaron Simon, Los Altos, CA (US); Roy Primus, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 758 days.

(21) Appl. No.: 10/731,830

(22) Filed: Dec. 9, 2003

(65) Prior Publication Data
US 2005/0121306 A1 Jun. 9, 2005

(51) Int. Cl.
*F27D 11/00* (2006.01)
*B01J 19/08* (2006.01)

(52) U.S. Cl. ........... 219/205; 219/388; 392/417; 60/300; 123/549

(58) Field of Classification Search ........... 219/205, 219/388; 392/417; 60/300, 303; 55/267, 55/DIG. 10; 123/549
See application file for complete search history.

(56) References Cited

U.S. PATENT DOCUMENTS

| | | | | |
|---|---|---|---|---|
| 1,560,589 A | * | 11/1925 | Andrews et al. | 34/421 |
| 4,170,455 A | * | 10/1979 | Henrie | 436/144 |
| 5,101,095 A | * | 3/1992 | Wagner et al. | 219/205 |

* cited by examiner

*Primary Examiner*—Philip H Leung
(74) *Attorney, Agent, or Firm*—Fletcher Yoder

(57) ABSTRACT

A particle reduction apparatus comprises a radiation absorption zone for receiving a gaseous flow carrying particulate matter. A transparent shield surrounds at least a portion of the radiation absorption zone. A radiation source for generating radiation and for directing the radiation into the radiation absorption zone to promote reduction of the particulate matter is provided, and an insulation layer at least partially surrounds the radiation source.

29 Claims, 2 Drawing Sheets

SYSTEM FOR RADIATION-BASED REDUCTION OF PARTICULATE MATTER

BACKGROUND OF THE INVENTION

The present invention generally relates to systems and methods for particulate matter treatment. More specifically, the present invention relates to a system and method for elimination of particulate matter in a gaseous flow by exposing the same to radiation.

Internal combustion engines, power plants, gas turbines and the like are among the most prevalent means of energy generation today. Energy generation using such means is typically associated with fuel materials such as coal, gasoline, diesel, jet fuel or other carbonaceous fuel and/or derivatives. The energy is generated by combustion of these fuels, and the combustion typically generates a number of pollutants, which may be harmful if released into the environment. One of the large components the pollutants is particulate matter, which includes unburnt or partially burnt fuel particles. The concentration of these particles vary depending on the operating conditions of the systems, such as internal combustion engines for example, and in general cannot be avoided over the entire range that the engine needs to operate. In general, the release of such particulate matter is undesirable, and it is reasonable to assume that regulations regarding the emission of particulates will continue to become more and more challenging to meet.

Existing technologies to eliminate the particulate matter from exhaust streams includes using a so-called Diesel Particulate Filter (DPF). The basic concept for the DPF is to collect the particles on a ceramic substrate and once sufficient quantity of particles are collected, use a controlled heat source, such as the fuel itself, to burn off the collected particles. The main drawbacks of the DPF include the fuel efficiency penalty resulting from the burning of the fuel to burn the particulates, the fuel efficiency penalty resulting from engine operation with a higher-than-normal exhaust pressure drop and the integrity of the ceramic filter materials subjected to the intense cyclic heating during regeneration. These factors contribute to low fuel efficiencies and high costs associated with replacement of the ceramic filter.

Accordingly, there exists a need for a new methodology to overcome the abovementioned problems, and a technique that effectively and efficiently disposes particulate matter.

BRIEF DESCRIPTION OF THE INVENTION

According to an embodiment, a particle reduction apparatus comprises a radiation absorption zone for receiving a gaseous flow carrying particulate matter. A transparent shield surrounds at least a portion of the radiation absorption zone. A radiation source for generating radiation and for directing the radiation into the radiation absorption zone to promote reduction of the particulate matter is provided, and an insulation layer at least partially surrounds the radiation source.

According to another embodiment a particulate matter reduction system comprises a source of a gaseous flow carrying particulate matter. The system further comprises a particle reduction apparatus comprising a radiation absorption zone for receiving a gaseous flow carrying particulate matter, a transparent shield surrounding at least a portion of the radiation absorption zone, a radiation source for generating radiation and for directing the radiation into the radiation absorption zone to promote reduction of the particulate matter and an insulation layer at least partially surrounding the radiation source. A control module coupled to the particle reduction apparatus is additionally provided in the system.

According to a yet another embodiment a method for reducing particulate matter in a gaseous flow comprises introducing the gaseous flow carrying the particulate matter into a radiation absorption zone and exposing the particulate matter to radiation in the radiation absorption zone, to at least partially reduce the particulate matter, as the gaseous flow traverses the radiation absorption zone.

BRIEF DESCRIPTION OF THE DRAWINGS

The foregoing and other advantages and features of the invention will become apparent upon reading the following detailed description and upon reference to the drawings in which.

DETAILED DESCRIPTION OF SPECIFIC EMBODIMENTS

Figure 1:
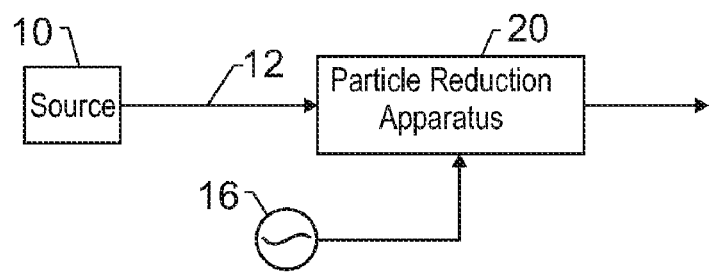
FIG. 1 is a schematic representation of a particulate matter reduction system according to an embodiment.

Reference is now drawn to FIG. 1 showing a particulate matter reduction system 100 according to one embodiment of the present invention. A source 10 of a gaseous flow 12 emits the gaseous flow 12 carrying particulate matter such as, for example, carbonaceous particulate matter. The source 10 may be a combustion unit emiting various products of combustion, such as particulate matter for example, as exhaust. Such combustion units include internal combustion engines, power plants, non-electric furnaces such as for metal extraction, liquid fuel gas turbines such as those used in jet engines, among others. The gaseous flow 12 carrying particulate matter is directed to a particle reduction apparatus 20 where the particulate matter is reduced or neutralized. The particle reduction apparatus 20 reduces or eliminates particulate matter by absorbing radiation in the particulate matter, thereby heating the particulate matter and increasing the chances of its reaction with reagents present in the surrounding environment. Radiation in the particle reduction apparatus 20 is generated using power from a power source 16, and radiation generation is discussed later with reference to FIG. 4.

As used herein, the term "reduction" refers to lessening in quantity. Reduction of particulate matter may be achieved by reacting the particulate matter with suitable reagents, such as oxygen, among others.

Figure 2:
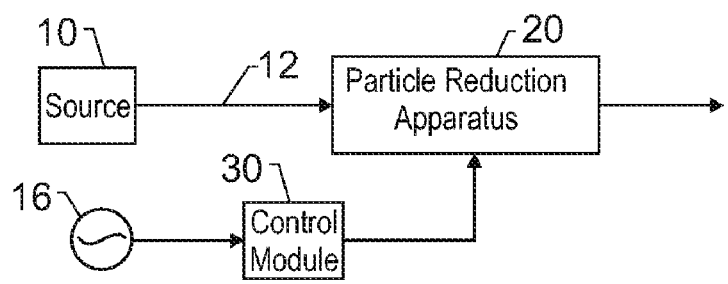
FIG. 2 is a schematic representation of a particulate matter reduction system according to another embodiment.

FIG. 2 illustrates a particulate matter reduction system 100 according to another embodiment of the present invention. The source 10 emits gaseous flow 12 carrying particulate matter to the particle reduction apparatus 20. A control module 30 is introduced to regulate the operation of the particle reduction apparatus 12. The control module 30 may be configured to regulate the power supply from the power source 16, thereby regulating the radiation provided to the particulate matter, and hence the rate of reduction.

As used herein, the term "control module" may refer to a computer or a control circuit that can receive inputs from other devices and responds to a set of instructions. Typically, a control module comprises a memory that enables storage of data and programs (input and output parameters, set of instructions) and a processing unit or circuit that executes instructions. The control module 30 may also be configured to keep track of time, as well as, perform monitoring and data recording.

Figure 3:
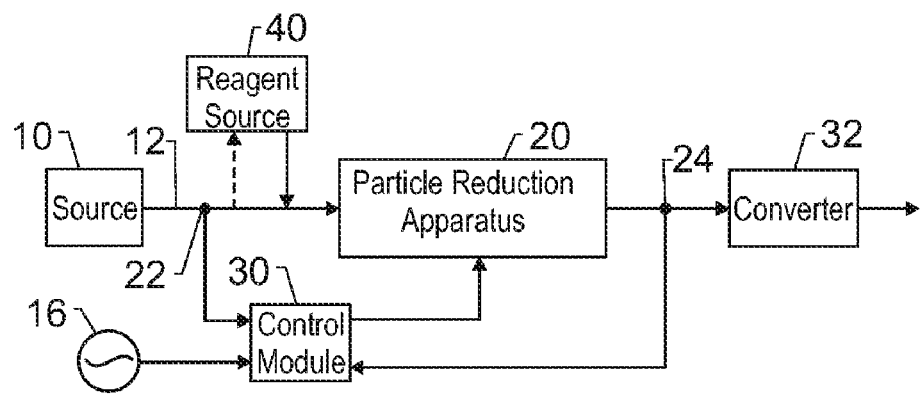
FIG. 3 is a schematic representation of a particulate matter reduction system according to another embodiment.

FIG. 3 illustrates a particulate matter reduction system 100 according to yet another embodiment of the present invention. Sensors 22, 24 are positioned upstream and downstream of particle reduction apparatus 20, respectively. The sensors 22, 24 may determine one or more parameters such as quantity of particulate matter present before and after treatment in the particle reduction apparatus 20, respectively. The control module 30 obtains values representative of the parameters to achieve efficient and effective regulation of the radiation provided to the particulate matter.

According to yet another aspect of the present invention, a reagent source 40 may introduce a reagent into the gaseous flow 12 to enhance the reduction of the particulate matter in the particle reduction apparatus 20. The reagent may be an element or a compound assisting in or enhancing the combination of the particulate matter with the reagent or surrounding matter, thereby resulting in its reduction. The reagent source may include oxidants such as oxygen or air, for example. Additionally it is noted that the control module 30 may vary rate and time duration of the reagent introduction into the particle reduction apparatus 20.

In a particular embodiment as illustrated in FIG. 3, a catalytic converter 32 may be positioned downstream of the particle reduction apparatus 20, to receive the radiation treated gaseous flow 12. The catalytic converter 32 may be configured to further reduce or eliminate the particulate matter 14 still present in the flow 12, or reduce/eliminate products of recombination of the particulate matter 14 formed in the apparatus 20. The converter 32 serves to enhance the particulate matter reduction performance of the particulate matter reduction system 100.

Figure 4:
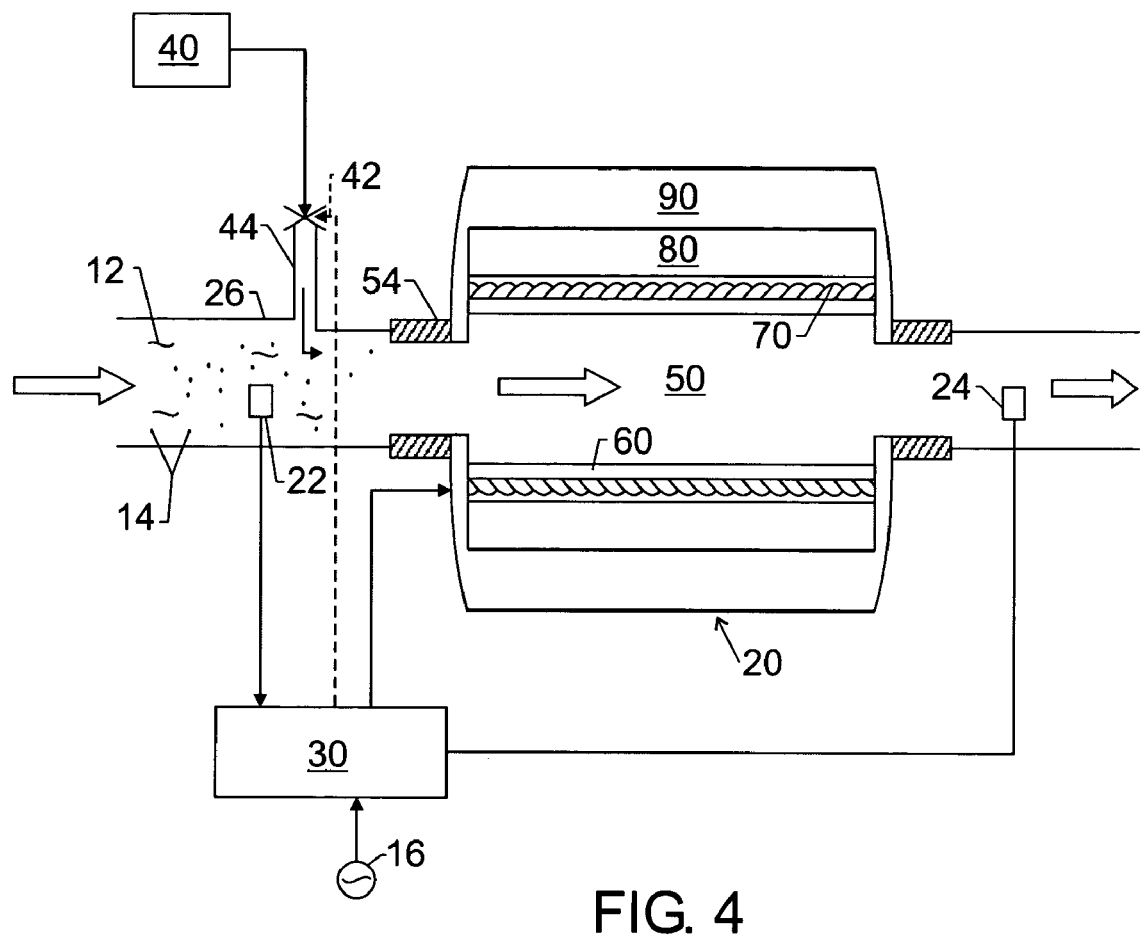
FIG. 4 is a cross section schematic of a particle reduction apparatus according to one embodiment.

FIG. 4 shows a cross section of the particle reduction apparatus 20 in conjunction with some elements of particulate matter reduction system 100, according to a presently contemplated implementation embodiment of the present invention. Gaseous flow 12 carrying particulate matter 14 originates from the source (not shown) such as a combustion unit discussed earlier. The flow 12 from the source is directed by a channel 26 to the particle reduction apparatus 20. A sensor 22 is placed (if desired) in the path of the flow 12, inside the channel 26 for measuring relevant parameters, and is coupled to the control module 30 for providing the parameter inputs. A reagent inlet 44, if provided, serves to introduce a reagent into the gaseous flow 12 and may be provided upstream of the particle reduction apparatus 20, for example, as represented in the figure. A valve 42 controls the reagent supply from the reagent source 40, entering the gaseous flow 12 through the inlet 44. The valve 42 may be an electronically actuated valve and additionally, may be coupled to the control module 30, to regulate the supply of the reagent in to the gaseous flow 12.

The particle reduction apparatus 20 comprises of a radiation absorption zone 50 at its center. The radiation absorption zone 50 is enclosed at least partially by a shield 60. It should be appreciated here that the cross sectional dimensions of the radiation absorption zone may be the same as or different from the channel 26. The shield 60 may be made of quartz or any other suitable material, which is transparent to radiations emitted and radiations in the nearby range of emitted wavelengths that may be reflected, and can withstand heat while maintaining its structural integrity. A radiation source 70 at least partially surrounds the shield 60. The radiation source 70 emit radiation on passage of electric current and may comprise platinum, molybdenum, tungsten radium, nichrome or suitable alloy wire elements, for example. It is appreciated here that any other similar and suitable source of electricity-based radiation is included within the scope of the present invention. For the presently contemplated embodiment the wavelengths of the radiation may correspond to a wide spectrum comprising of thermal, infrared or near infrared radiation, and the radiation generally follows plank's distribution. Further, it is appreciated that radiation source 50 may be configured to have a specific wavelength range of operation, from this spectrum, for optimum performance. In this embodiment, the control module 30 may regulate power supply to the radiation source 70.

The shield 60 effectively protects the radiation source 70 from the gaseous flow 12 and is helpful in transmitting the radiation from the radiation source 70 into the radiation absorption zone 50. An insulation layer 90 at least partially surrounds the radiation source 70, providing thermal insulation to the arrangement. The insulation layer 90 typically comprises materials having high thermal resistance, such as alumina silicate or quartz wool, for example. Inner surface of the insulation layer 90 may be reflective, so that a substantially large part of the radiation is directed into the radiation absorption zone 50. Additionally, a vacuum zone 80 may be provided between the radiation source 70 and the insulation layer 90. Alternately, the radiation source 70 may be housed in the vacuum zone 80. An impervious layer 82 such as a ceramic layer, for example, may be provided (if required) between the insulation layer 90 and the vacuum zone 80 to preserve the vacuum. Further, a casing layer 92, such as a metallic sheet layer, a ceramic layer or a plastic layer, for example, may be provided over the insulation layer 90, if required.

A seal 54 coupling the flow-carrying channel 26 to the particle reduction apparatus 20, from both sides of the apparatus 20, may be provided as a means for preventing leakage of the gaseous flow 12, and may additionally provide partial or full structural support to the apparatus 20. Exemplary seal 54 may include screw mounts, glass to metal connectors, among others. The seal 54 is also configured to preserve vacuum in the vacuum zone 80. Further, the seal 54 is suitably configured to adapt to the size difference in the channel 26 and the apparatus 20, while preventing leakage of gaseous flow 12.

Where desired, a sensor 24 is placed downstream of the particle reduction apparatus 20, to measure relevant parameters after the treatment of the particulate matter 14 in the apparatus 20. The sensor 24 is coupled to the control module 30 for providing the input of values corresponding to such parameter(s). Illustration of the particle reduction apparatus 20 and various components in FIG. 4 is intended to representational, and not meant to be to scale.

Figure 5:
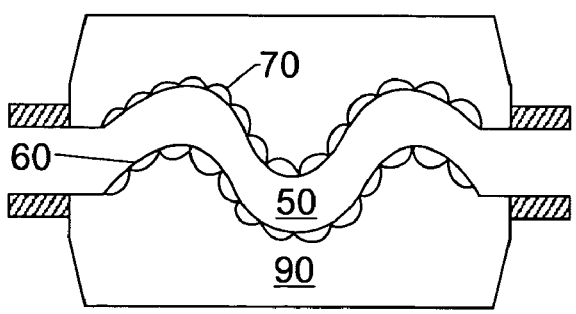
FIG. 5 is a cross section schematic of a particle reduction apparatus according another embodiment.

According to an operational embodiment of the present invention, with reference to FIG. 4, the gaseous flow 12 carrying particulate matter 14, emitted by the source (not shown) such as a combustion unit discussed earlier, is introduced into the particle reduction apparatus 20. More specifically, the gaseous flow 12 is introduced in the radiation absorption zone 50, where the particulate matter 14 is exposed to radiation generated by a device such as the radiation source 70, for example. As the particulate matter 14 traverses the radiation absorption zone 50, due to the high emissivity of the particulate matter 14, the particulate matter absorbs most of the energy from the radiation, whereas carrying gases in the gaseous flow 12 remain substantially transparent to the radiation. The heated particulate matter 14 reacts with surrounding matter, including reagent and/or oxygen present in the gaseous flow, among others. The reaction causes a recombination of the particulate matter 14 with other elements, and hence reduces or eliminates the particulate matter 14 in the process. It is appreciated here that increasing residence time of particulate matter 14 in the radiation absorption zone 50 advantageously increases the reduction of the particulate matter 14, and may be achieved by increasing the length of the radiation absorption zone 50. For example, the radiation absorption 50, shield 60, radiation source 70 may be configured in multiple turns inside an insulation layer 90, as indicated in FIG. 5, to increase the residence time.

It is contemplated that, in an embodiment, the particle reduction apparatus 20 may be implemented in an open loop configuration and used on "as needed" basis. In such an implementation operation of the particle reduction apparatus 20 may be actuated by mechanical or electronic switches. The regulation of radiation source 70, in such cases, may be time based (operating periodically for some time) or be initiated by a user, among other possibilities. In this embodiment, the control module 30 will not be utilized.

In another aspect of the instant invention, the amount of radiation directed into the radiation absorption zone 50 to be absorbed by the particulate matter 14, may be regulated by a control module 30. The amount of radiation has a direct bearing on the energy absorbed by the particulate matter, and hence the rate at which reduction of particulate matter occurs. The control module 30 may regulate the radiation based on the required particulate matter reduction rate. For this purpose determination of quantity of particulate matter present at the apparatus inlet or the apparatus outlet is made using sensing means such as sensors 22, 24. For example, if the incoming flow 12 to the particle reduction apparatus 20 contains a high amount of particulate matter, the control module 30 may regulate the power supply in order to direct a high amount of radiation to the particulate matter 14. Similarly, if the outgoing flow 12 from the particle reduction apparatus 20 contains high amount of particulate matter, the control module 30 may regulate the radiation source 70 to increase the radiation directed into the radiation absorption zone 50. Conversely, if the particulate matter quantity is low, the control module 30 may stop or decrease the radiation by regulating the power source. Though reference has been drawn to particulate matter quantity, it will be appreciated that other parameters, such as the speed or acceleration of a combustor such as an engine, fuel flow to the combustor, stage of operation of the combustor, planned maneuver of the engine, among others, may be detected to regulate the radiation source 50.

In a yet another aspect of the present invention, a reagent from the reagent source 40, controlled by a valve 42, may be introduced into the flow 12 through the reagent inlet 44. This flow 12 carrying the reagent is then exposed to radiation in the radiation absorption zone 50. The reagent either reacts with the particulate matter 14 or serves to enhance the possibility of a reaction of the particulate matter with other matter present in the gaseous flow 12. For example, the reagent may be an oxidant or a catalyst, among others. The overall effect of this is an increased rate of reduction of the particulate matter 14. In a related aspect of the invention, the introduction of the reagent in the flow 12 may be regulated by the control module 30. This may be achieved by coupling the valve 42 to the control module 30. For example, the control module 30 may increase the rate of reagent supply to the flow 12 if the quantity of the particulate matter is high in the flow. Alternately, the reagent supply may also be synchronized with the radiation being imparted in the particle reduction apparatus 20 to increase the reduction rate. Various other permutations and combinations of the regulation of the power supply and the reagent supply may be arrived at, based on requirements, and all such arrangements are contemplated herein.

The control module 30 may further be configured to stop the radiation in certain time intervals. The time intervals in which the radiation is stopped may be selected to control the net amount of particulate matter released over a larger interval of time, to achieve a time averaged reduction of the particulate matter. The time intervals in which the radiation is stopped may also be selected to coincide with other conditions, such as increased engine load due to use of air conditioning, for example.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A particle reduction apparatus comprising:
   a radiation absorption zone for receiving a gaseous flow carrying particulate matter;
   a transparent shield surrounding at least a portion of the radiation absorption zone;
   a radiation source configured to receive power from a power source and to generate radiation and to direct the radiation into the radiation absorption zone to promote reduction of the particulate matter from the gaseous flow, the radiation source separated from the flow of the particulate matter by the transparent shield;
   an insulation layer at least partially surrounding the radiation source;
   a vacuum zone positioned between the radiation source and an impervious layer,
      wherein the impervious layer is annular to the insulation layer; and
   a casing layer at least partially covering the insulation layer.

2. The apparatus of claim 1, wherein the insulation layer is reflective of radiation from the radiation source to direct radiation towards the radiation absorption zone.

3. The apparatus of claim 1, wherein the shield comprises of quartz.

4. The apparatus of claim 1, wherein the radiation source comprises of a thermally resistive element suitable for producing radiation.

5. The apparatus of claim 1, further comprising a seal disposed at the ends of the apparatus configured to prevent leakage of the gaseous flow.

6. The apparatus of claim 1, further comprising a power source coupled to the radiation source for providing power to the radiation source.

7. The apparatus of claim 6, further comprising a control module coupled with the radiation source and the power source, wherein the control module is operationally positioned between the radiation source and the power source.

8. The apparatus of claim 7, further comprising at least one sensor coupled to the control module for detecting at least one operational parameter of a system in which the apparatus is placed, for regulation of operation of the radiation source.

9. The apparatus of claim 8, wherein the at least one sensor detects the at least one parameter of the gaseous flow downstream of the radiation absorption zone, and wherein the control module is coupled to the at least one sensor and to the radiation source for regulating power to the radiation source based upon the at least one parameter.

10. The apparatus of claim 8, wherein the at least one sensor detects the at least one parameter of the gaseous flow upstream of the radiation absorption zone, and wherein the control module is coupled to the at least one sensor and to the radiation source for regulating power to the radiation source based upon the at least one parameter.

11. The apparatus of claim 8, wherein a first sensor detects the at least one parameter of the gaseous flow downstream of the radiation absorption zone and a second sensor detects the at least one parameter of the gaseous flow upstream of the radiation absorption zone, and wherein the control module is coupled to the sensors and to the radiation source for regulating power to the radiation source based upon the at least one parameter.

12. The apparatus of claim 7, further comprising a reagent inlet upstream of the radiation absorption zone.

13. The apparatus of claim 12, further comprising a valve coupled to the reagent inlet.

14. The apparatus of claim 13, wherein the valve is coupled to the control module and wherein operation of the valve is regulated by the control module.

15. A particulate matter reduction system comprising:
a source of a gaseous flow carrying particulate matter;
a particle reduction apparatus comprising
  a radiation absorption zone for receiving the gaseous flow carrying particulate matter,
  a transparent shield surrounding at least a portion of the radiation absorption zone,
  a radiation source configured to receive power from a power source and to generate radiation and to direct the radiation into the radiation absorption zone to promote reduction of the particulate matter from the gaseous flow, the radiation source separated from the flow of the particulate matter by the transparent shield,
  an insulation layer at least partially surrounding the radiation source;
  a control module coupled to the particle reduction apparatus;
  a vacuum zone positioned between the radiation source and an impervious layer,
    wherein the impervious layer is annular to the insulation layer; and
  a casing layer at least partially covering the insulation layer.

16. The system of claim 15, further comprising:
a channel for directing the gaseous flow from the source to the particle elimination apparatus; and
a seal disposed between the apparatus and the channel for preventing leakage of the gaseous flow.

17. The system of claim 15, further comprising a power source to provide power to the radiation source.

18. The system of claim 17, wherein the control module is positioned operationally between the radiation source and the power source.

19. The system of claim 18, further comprising at least one sensor coupled to the control module for detecting at least one operational parameter of the system for regulation of the radiation source.

20. The system of claim 19, wherein the at least one sensor detects the at least one parameter of the gaseous flow downstream of the radiation absorption zone, and wherein the control module is coupled to the at least one sensor and to the radiation source for regulating power to the radiation source based upon the at least one parameter.

21. The system of claim 19, wherein the at least one sensor detects the at least one parameter of the gaseous flow upstream of the radiation absorption zone, and wherein the control module is coupled to the at least one sensor and to the radiation source for regulating power to the radiation source based upon the at least one parameter.

22. The system of claim 19, wherein a first sensor detects the at least one parameter of the gaseous flow downstream of the radiation absorption zone and a second sensor detects the at least one parameter of the gaseous flow upstream of the radiation absorption zone, and wherein the control module is coupled to the sensors and to the radiation source for regulating power to the radiation source based upon the at least one parameter.

23. The system of claim 18, further comprising a reagent inlet upstream of the radiation absorption zone.

24. The system of claim 23, further comprising a valve coupled to the reagent inlet.

25. The system of claim 24, further comprising a reagent source coupled to the reagent inlet, wherein the reagent source supplies at least some quantity of a reagent to the inlet and wherein supply of reagent is controlled by the valve.

26. The system of claim 25, wherein the valve is coupled to the control module and wherein operation of the valve is regulated by the control module.

27. The system of claim 15, wherein the source of gaseous flow is a carbonaceous material combustion module exhaust.

28. The system of claim 27, wherein the source of gaseous flow is an internal combustion engine.

29. The system of claim 15, further comprising a catalytic converter coupled to the particle elimination apparatus, wherein the catalytic converter is positioned downstream of the particle elimination apparatus.

* * * * *